J. F. STANKIEWICZ.
GOPHER TRAP.
APPLICATION FILED JAN. 6, 1920.
1,351,351.  Patented Aug. 31, 1920.
2 SHEETS—SHEET 1.
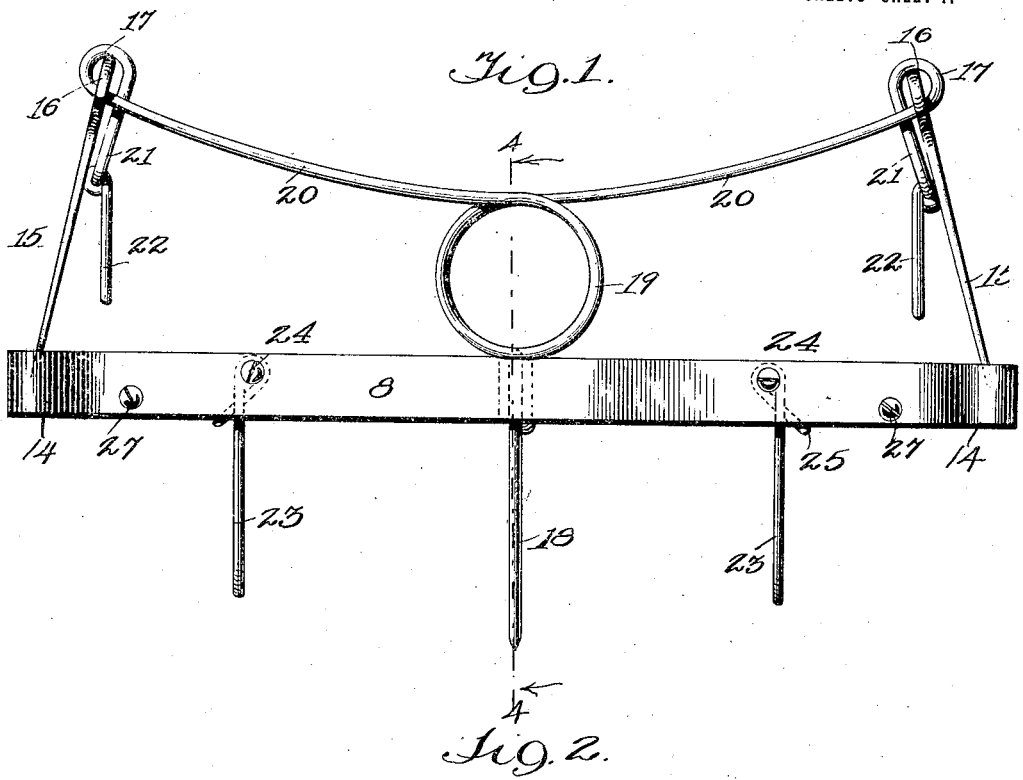
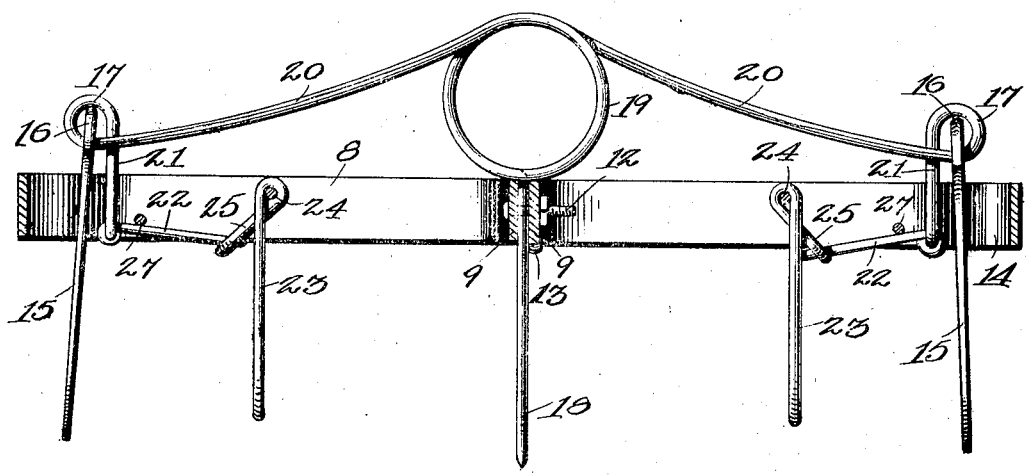
WITNESSES
George G. Myers
Geo. S. Brock
INVENTOR
J. F. STANKIEWICZ,
BY Munn & Co.
ATTORNEYS

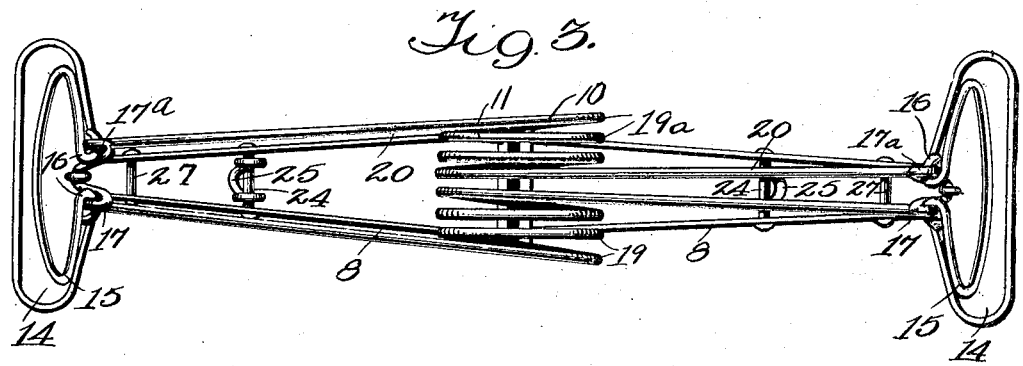
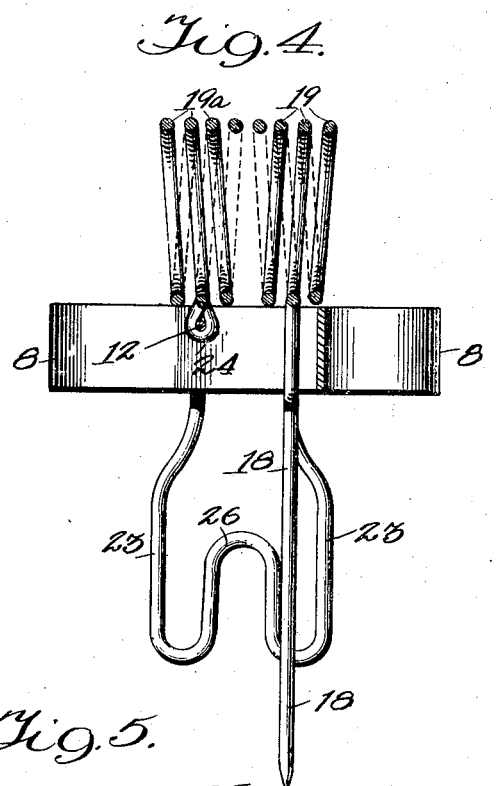

UNITED STATES PATENT OFFICE.

JOSEPH FREDRECH STANKIEWICZ, OF BANDON, OREGON.

GOPHER-TRAP.

1,351,351.  Specification of Letters Patent.  Patented Aug. 31, 1920.

Application filed January 6, 1920. Serial No. 349,761.

*To all whom it may concern:*

Be it known that I, JOSEPH FREDRECH STANKIEWICZ, a citizen of the United States, and a resident of Bandon, in the county of Coos and State of Oregon, have invented certain new and useful Improvements in Gopher-Traps, of which the following is a specification.

My invention relates to devices for trapping animals and more especially to traps for catching gophers, moles and other burrowing rodents.

An object of my invention is to provide a trap that is strong in construction and positive in action.

Another object is to provide a trap of the character mentioned made of light metal parts.

Another object is to provide a mole or gopher trap that may catch two animals simultaneously, and that may catch the animal going into or out of the burrow.

A further object is to provide a gopher trap with a trigger so arranged that upon attempt of the gopher to cover up the runway in which the trap is set, that such act of covering up releases the trigger.

With these and other objects in view, my invention consists in certain novel features of construction and arrangement of parts as will be hereinafter fully described and pointed out in the claims, reference being had to the accompanying drawing in which—

Figure 1 is a side elevation of the device in unset condition;

Fig. 2 is a vertical longitudinal section of the same with trap set;

Fig. 3 is a top plan view;

Fig. 4 is a vertical transverse section on line 4—4 of Fig. 1;

Fig. 5 is a perspective view of one of the triggers.

In carrying my invention into effect, I provide a frame having transversely elongated horizontal loops at each end, the frame and loops being made from a single piece of strap metal, the frame having one continuous side bar 8 and the opposite side being formed by bringing the ends 9 of the trap to the center bending at about a right angle at 10 toward the continuous side bar and doubling the extreme ends 11 back on the right angled part with the folds lying against the continuous side bar; the doubled ends are then provided with a perforation in each in alinement to receive a bolt 12 by means of which the space between the folded ends may be regulated and such bolt also serving as an anchor for one end 13 of an actuating spring of the trap as will be more fully set forth hereinafter.

As before stated the opposite ends of the trap consists of transverse loops 14, the loops being elongated to project at each side of the frame, the office of these loops being to provide a way and guide for the choker rings 15.

The choker rings are made of very thin but strong wire, and have a generally annular contour slightly elongated or oval shape, and open, the ends bent into eyes 16 which swing in eyes 17 formed in spring mechanism, which will now be more specifically set forth.

One spring member has a pointed end 18 which is designed to be forced into the earth to hold the entire device in place; from the pointed end the member extends up between the spaced apart ends of the side bar of the frame and is then formed into a double coil 19 at one side of the frame, then extending outwardly as at 20 and upwardly to a point above the transverse end loops and then bent into an eye 17 and downwardly then upwardly again forming a loop 21 and ending in another eye $17^a$, the downwardly extending part or loops between the eyes having flexibly hung therein the detent rod 22 for the trigger 23 of the trap; the wire 20 then extends back toward the center of the frame at opposite sides and being coiled into a couple of convolutions $19^a$ passes downwardly and is twisted a quarter turn to form an eye 24 through which the bolt, which holds the inturned ends of the frame, passes; the spring is then from this quarter turned eye coiled into a couple of convolutions and then extends to the opposite end of the trap, where it is fashioned into the eyes 17 and $17^a$ similar to the other side end of the trap and the loop 21 just as at the other end of the trap and returning to the center of the frame is formed into a couple of coils and the end formed into a hook 13 which catches under one of the inturned ends of the frame.

The triggers 23 (both being alike), consist of a single piece of wire bent to form side bars having eyes at the upper ends passing over the bolts 24 connecting the sides of the frame and continuing forwardly and obliquely downward to form a loop 25 within which the detent 22 is held when the trap is set. The side bars of the trigger are spread outwardly toward their lower ends and then bent inwardly and upwardly forming a rigid loop 26, to which part bait may be applied.

To set the trap for use the choker bails carried at the outer ends of the spring mechanism, are forced downwardly through elongated guide loops 14 at the ends of the frame, and the pivotally hung detent bar 22 is swung beneath the bolt 27 connecting the sides of the frame immediately at the rear of the elongated loop just mentioned, and the end of the detent seated in the looped tongue of the trigger.

With both ends of the trap thus prepared, it is put in place where desired and held there against movement by the spike or pointed end of the coiled spring, as before pointed out.

With the device thus set and placed, it will be seen that the mole or gopher approaching from either direction will pass through the choker bail and contacting the trigger will push it so that it will swing the tongue from beneath the end of the detent 22 which will drop, and the coil springs then being free to act will cause the choker bail to jump quickly up through the elongated loop at that end of the trap and catch the gopher between the frame and the jump-up bail.

It will be noted that by the use of the device as herein shown and described, that the trigger is so arranged that as soon as the gopher starts to cover up the runway in which the trap is set, it releases the trigger, and the spring is bound to fly up, whereby the gopher is caught.

It will also be noted that the trap is duplex or double ended, whereby two animals can be caught at one setting of the trap.

Again it should be noted that the part that holds the gopher is made of thin wire and nothing is likely to catch, whereas if there is too much surface exposed it has a tendency to retard the action of the springs.

I claim:

1. In a trap the combination with a frame comprising metal side bars and a laterally elongated guide loop at each end, spring mechanism held in said frame centrally of said elongated loops, choker ring arms associated with the said spring mechanism and actuated thereby, said arms extending from said spring mechanism to the outer ends of said frame and above the elongated loops of the frame, choker rings loosely hung at the outer ends of said arms and guidedly held in the elongated loops, a detent supporting loop at the outer end of said arms, a detent pivotally hung to said detent supporting loop, triggers mounted between the side bars of the frame intermediate the laterally elongated end loops and the central part of said frame, and means for anchoring the trap against relative movement.

2. A trap as herein characterized comprising a longitudinally elongated metal frame having laterally elongated rigid loops at opposite ends thereof, coil spring mechanism mounted on said frame centrally of said end loops, trigger mechanism suspended from said frame between the end loops and the spring mechanism, choker bails carried by said spring mechanism and passing through said end loops, a detent hung within said choker bail and adapted to be held by said trigger mechanism, and means for anchoring the entire trap in position.

3. A trap as herein characterized and consisting of a frame made of strap metal side bars and integral laterally elongated end loops at each end, coiled spring mechanism at the center of said frame, wire arms extending from said spring mechanism in opposite directions, choker bails suspended from the outer ends of said arms and within said laterally elongated end loops, detents also suspended at the outer ends of said arms, and triggers pivotally mounted in said frame between the side bars thereof, said triggers including a pendent frame and a tongue adapted to hold said detents when the trap is set, said trigger positioned between the elongated end loops and the central spring mechanism.

JOSEPH FREDRECH STANKIEWICZ.